United States Patent [19]

Frerichs

[11] Patent Number: 4,756,635
[45] Date of Patent: Jul. 12, 1988

[54] DOG CLUTCH BETWEEN A DRIVE MECHANISM AND A RIBBON CARTRIDGE

[75] Inventor: Klaus-Dieter Frerichs, Schortens, Fed. Rep. of Germany

[73] Assignee: Olympia Aktigngellschaft, Fed. Rep. of Germany

[21] Appl. No.: 29,081

[22] Filed: Mar. 23, 1987

Related U.S. Application Data

[63] Continuation of Ser. No. 731,712, May 7, 1985, abandoned.

[51] Int. Cl.⁴ .......................... B41J 32/00; B41J 33/16
[52] U.S. Cl. ..................................... 400/208; 400/236; 464/30
[58] Field of Search ............... 400/144.2, 175, 194, 400/195, 196, 196.1, 207, 208, 208.1, 223, 228, 236, 242, 243, 674, 693.1; 242/68.5, 197, 198, 199, 200; 403/223, 291, 372; 464/30, 37, 106, 159

[56] References Cited

U.S. PATENT DOCUMENTS

| | | | |
|---|---|---|---|
| 3,954,163 | 5/1976 | Gabor | 400/175 X |
| 4,209,261 | 6/1980 | Bell et al. | 400/196.1 X |
| 4,299,504 | 11/1981 | Benz et al. | 400/208 |

FOREIGN PATENT DOCUMENTS 8113901 10/1981 Fed. Rep. of Germany .
8223076 11/1982 Fed. Rep. of Germany .

OTHER PUBLICATIONS

IBM Technical Disclosure Bulletin, vol. 20, No. 5, Oct. 1977, pp. 1873–1874, "Rotatable Drive Coupling For A Take-up Spool" by Kirksey 400/236.

Primary Examiner—Charles Pearson
Attorney, Agent, or Firm—Wood, Herron & Evans

[57] ABSTRACT

A dog clutch is disclosed for interconnecting the drive mechanism of a cartridge holder and the ribbon drive in a cartridge, which clutch permits a coupling in any position of the coupling parts. One coupling component is a hollow pin in the opening of which the spindle with knife-like entrainment componets can be inserted for rotary entrainment under elastic deformation of the wall of the hollow pin.

5 Claims, 1 Drawing Sheet

4,756,635

DOG CLUTCH BETWEEN A DRIVE MECHANISM AND A RIBBON CARTRIDGE

This is a continuation of application Ser. No. 731,712, filed May 5, 1985, now abandoned.

BACKGROUND OF THE INVENTION

The invention concerns a dog clutch between a drive mechanism of a cartridge holder and a ribbon drive of a ribbon cartridge of the type in which a spindle with dog components can be inserted in a clutch component for rotary drive of the clutch component.

Modern office machines use ribbon cartridges which contain the ribbon required for typing on a medium. The ribbon cartridges can be inserted in holders of the typewriters, with a drive mechanism arranged in this device being coupled with the ribbon drive in the ribbon cartridge through a dog clutch. To enable insertion of the ribbon cartridges in any position of the components to be coupled, the German Utility Model No. 82 23 076 suggests a formed spring serving as a drive pin and which engages entraining components of the ribbon drive only in expanded condition. But a rotary entrainment of the ribbon drive is effected only when the formed spring snaps into a corresponding recess of the entrainment component. Since an immediate drive of the ribbon is not ensured thereby, imprinting defects cannot be avoided.

Previously known from the German Utility Patent No. 81 13 901, moreover, is a dog clutch with a dog which is molded sideways to a spindle which can be inserted in the center of the clutch component. But this positive coupling has the disadvantage that drive elements of the drive mechanism can be damaged or destroyed if the ribbon locks inside the cartridge.

The problem underlying the invention is to provide a dog clutch which enables an insertion of the ribbon cartridges in the holder device in any position of the coupling parts, assures an immediate drive of the ribbon after installation of the cartridges, and reliably prevents drive elements of the drive mechanism from being destroyed or damaged in case of any locking of the ribbon.

SUMMARY OF THE INVENTION

The present invention is predicated upon the concept of providing a rotary clutch between the drive mechanism of a cartridge holder and a ribbon drive wheel of a ribbon cartrigde comprising a spindle with at least one knife-like dog component, the spindle being insertable in a hollow clutch component having a flexible inner wall. When the spindle is inserted, it elastically deforms the flexible wall so that the clutch component and ribbon drive are positively connected for rotary movement with the drive spindle.

The present dog clutch is advantageous in that it enables a ribbon cartridge installation in any position of the coupling components and always guarantees a reliable drive of the ribbon. Moreover, damage to the drive elements is safely prevented as well in case the ribbon should lock.

Other objects and advantages of the present invention will be more readily apparent from a consideration of the following detailed description of the drawings illustrating a preferred embodiment of the invention.

DESCRIPTION OF A PREFERRED EMBODIMENT

Figure 1:
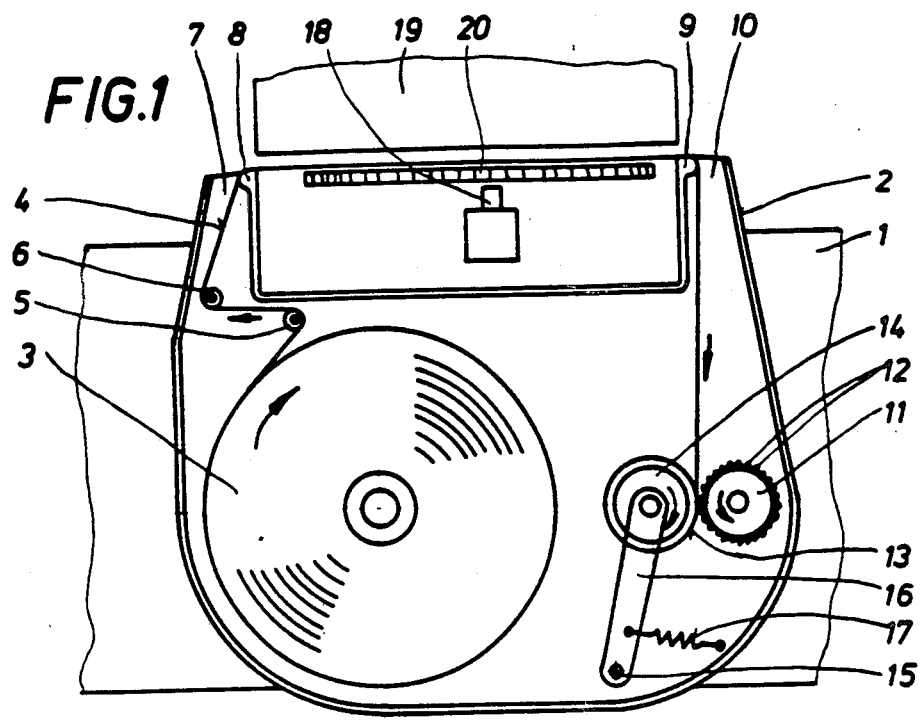
FIG. 1 shows a plan view of the cartridge holder with the ribbon cartridge in crosssection.

Illustrated in FIG. 1 is a cartridge holder 1 of a typewriter or similar office machine with an installed ribbon cartridge 2. Rotatably mounted in this ribbon cartridge 2 is a take-off reel 3 for a ribbon 4 from which the ribbon 4, for instance, a carbon ribbon, is threaded via guide pins 5, 6 out of an exit opening 7, over guide arms 8, 9 through the printing station and through an entrance opening 10 back again into the ribbon cartridge 2. Rotatably mounted additionally in the ribbon cartridge 2 is a spiked roll 11 which is fashioned as a drive wheel and whose spikes 12 engage the outer layer of ribbon 13 coiled about a take-up reel 14. The take-up reel 14 is mounted rotatably on a swivel arm 16 which swivels on a pin 15 and is spring-loaded by a spring 17 in such a way that the spikes 12 will always engage the coiled ribbon 13 on the take-up reel 14. Illustrated also in FIG. 1 is a print hammer 18 which, e.g., can be driven electromagnetically and, when striking a character of a print wheel 20, produces through the intermediary of the ribbon 4 an imprint on the printing medium 19.

Figure 2:
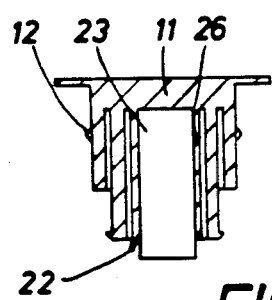
FIG. 2 shows the coupling parts of the dog clutch prior to coupling.
Figure 3:
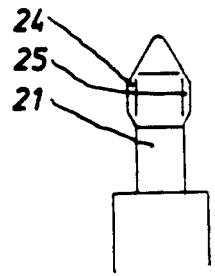
FIG. 3 shows the dog clutch in coupled condition.
Figure 3:
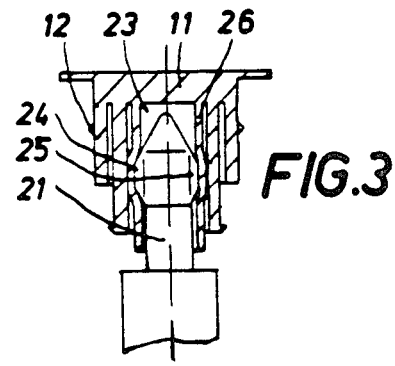
Figure 4:
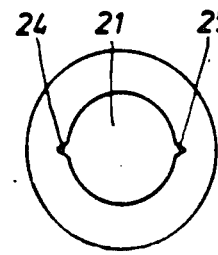
FIG. 4 is a plan view of the dog clutch spindle.

According to FIG. 2, the dog clutch between the drive mechanism of a cartridge holder 1 and the spiked feed roll 11 in the cartridge 2 consists of a spindle 21 and a hollow pin 22 serving as second clutch component. This hollow pin 22 features a blind hole 23 into which the spindle 21 with dog components 24, 25 can be inserted for rotary entrainment under elastic deformation of the wall 26 of the hollow pin 22. Depending on the material used to make the hollow pin 22, a slight plastic deformation may occur as well. The dog clutch is illustrated in FIG. 2 before coupling and in FIG. 3 in coupled condition. The spindle 21 which can be inserted in centered fashion in the opening 23 in the hollow pin 22 has a cylindrical design and features at least one knife-like entrainment edge 24, 25 which is fashioned as a dog-type component and extends parallel with the longitudinal center axis of the dog clutch. While this guarantees a safe rotary entrainment of the spiked feed roll 11 by the drive mechanism of the cartridge holder 1, two knife-like entrainment edges 24, 25 which are arranged diametrically opposed on the outer circumference of the spindle 21 are preferred for more even stressing of the drive components. As the ribbon cartridge 2 is placed in the cartridge holder 1, the hollow pin 22 is automatically slipped over the spindle 21. The dog-type edges 24, 25 expand in the process the flexible hollow pin 22, thereby always guaranteeing a dependable rotary entrainment. Removing the ribbon cartridge 2 from the cartridge holder 1 is simple as well, whereafter the wall 26 again assumes its cylindrical shape. Installation and/or removal of the ribbon cartridge is possible in a simple manner in any position of the coupling parts.

In case of a blockage of the take-off reel and/or the spiked feed roll 11, the spindle 21 can spin inside the opening 23 of the hollow pin 22. Damage or destruction of the drive components is thus safely prevented.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims.

Having described my invention, I claim:

1. A dog clutch for connecting the drive mechanism of a cartridge holder and a ribbon drive of a ribbon cartridge, said dog clutch comprising:

a spindle;

a hollow pin clutch component, said hollow pin clutch component having an opening for receiving the spindle, said hollow pin clutch component including a resilient wall surrounding said opening;

said spindle having outwardly extending knife-like entrainment components which substantially elastically deform said wall when the spindle is inserted in the opening in said hollow pin clutch component;

the engagement of said spindle and said hollow pin clutch component providing the sole driving means for said ribbon drive;

said hollow pin clutch component being engageable with said spindle in any relative rotative position of said hollow pin clutch component and said spindle;

said spindle being rotatable within said hollow pin clutch component in the event said hollow pin clutch component is prevented from rotation by blockage of said ribbon drive.

2. The clutch of claim 1 in which said spindle is cylindrical and in which one entrainment component extends radially outwardly from said spindle parallel with the longitudinal center axis of the spindle.

3. A clutch of claim 2 in which said entrainment components are carried at diametrically opposite points on the outer circumference of said spindle.

4. The clutch of claim 1 in which the spindle is permanently connected with the drive mechanism of the cartridge holder and the hollow pin clutch component is permanently connected with the ribbon drive in the ribbon cartridge.

5. The clutch of claim 4 in which the hollow pin clutch component is integral with a spiked feed roll which is rotatably mounted in the ribbon cartridge, the spiked feed roll engaging and driving a ribbon wound about a take-up reel.

* * * * *